No. 716,960.     W. THOMPSON.     Patented Dec. 30, 1902.
METALLIC TIRE.
(Application filed June 11, 1902.)
(No Model.)
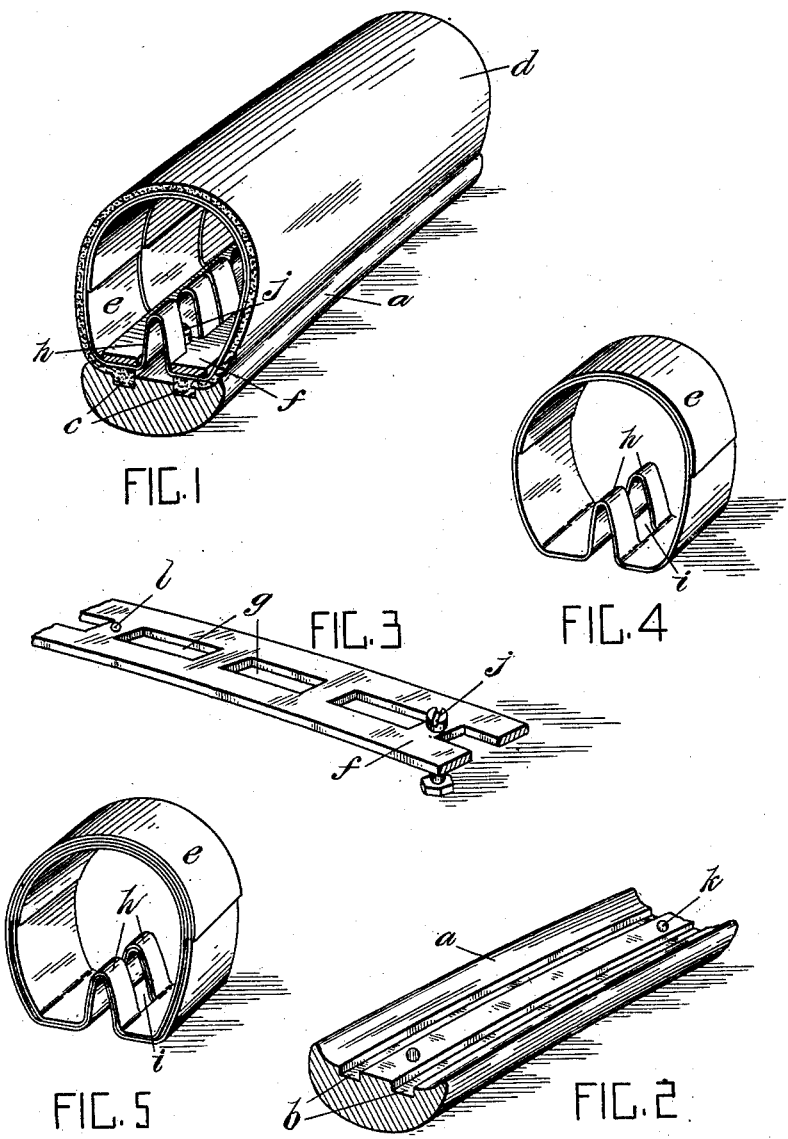

UNITED STATES PATENT OFFICE.

WILLIAM THOMPSON, OF WOODSTOCK, CANADA.

METALLIC TIRE.

SPECIFICATION forming part of Letters Patent No. 716,960, dated December 30, 1902.

Application filed June 11, 1902. Serial No. 111,206. (No model.)

*To all whom it may concern:*

Be it known that I, WILLIAM THOMPSON, of Woodstock, in the county of Oxford and Province of Ontario, Canada, have invented certain new and useful Improvements in Metallic Tires; and I hereby declare that the following is a full, clear, and exact description of the same.

This invention relates to certain new and useful improvements in that class of metallic tires consisting of a plurality of independent annular sections flexibly connected to the rim and protected by a tubular covering, the object of the invention being to so construct and arrange the annular sections and secure them to the rim that a maximum of flexibility and resiliency will be attained.

In carrying out the invention I employ a series of annular sections, the meeting edges of which overlap and movably embrace the sides of the body portions, permitting the sections to contract and expand individually and collectively when responding to the flections of the tire, the middle of the overlapping parts forming the tread thereof. In the annular sections, in diametric opposition to the tread, are internal section-spacing protuberances projecting through corresponding apertures in the tire-holding plate, and formed in the annular sections contiguous to the protuberances are bolt-receiving slots for the clamping-bolts which fasten the tire-holding plate to the rim. In the rim are circumferential grooves parallel with the edges thereof to receive the annular flanges of the tubular covering for the annular sections, which are secured in the grooves by the pressure of the annular sections under the influence of the locking-plate and clamping-bolts, as hereinafter more fully set forth, and more particularly pointed out in the claims.

In the drawings, Figure 1 is a perspective view of a section of the tire. Fig. 2 is a similar view of a section of the rim. Fig. 3 is a similar view of a section of the locking-plate. Fig. 4 is a similar view of one of the annular sections. Fig. 5 is a similar view of a modification of the construction shown in Fig. 4.

Like letters of reference refer to like parts throughout the specification and drawings.

In the outer face of the rim $a$ are circumferential grooves $b$, equidistant from each other and the edges of the rim, to receive the annular flanges $c$ of the tubular covering $d$, which incloses the annular sections $e$. The annular sections $e$ completely encircle the rim and bear on sufficient margins of the tubular covering to hold the annular flanges $c$ in the circumferential grooves $b$ or, in the event of the grooves and flanges being omitted, which in some cases is possible, to securely bind the margins to the rim. The meeting edges of the annular sections overlap to form the tread and movably embrace the inner and outer faces, respectively, of the body portions to allow of the contraction and expansion of the sections when responding to the flections of the tire. By this means the sections can respond individually or collectively to the irregularities of the path over which the tire is passing by instantaneously contracting at the moment of impact and then gradually expanding to normal size, the contraction and expansion being limited, however, by the contact of the meeting edges against the edges of the locking-plate $f$. The locking-plate $f$ encircles the rim and is fitted with apertures $g$ for the internal section-spacing protuberances $h$ of the annular sections $e$. These protuberances, as shown in the drawings, are integrally formed with the annular sections in opposition to the tread by the bodies of the sections being bent inwardly to form substantially V-shaped lugs having between them bolt-receiving slots $i$. These protuberances have been found to be the simplest and most effective means of properly spacing the annular sections and preventing the circumferential or lateral displacement of the sections on the rim; but I do not wish to confine the invention strictly to the use of the same, as it is possible to dispense with them by increasing the number of bolt-receiving slots in each section and correspondingly increasing the number of clamping-bolts $j$, which would have the effect of preventing the displacement of the sections on the rim, but would also have the disadvantage of materially increasing the expense of fitting the tire thereto. The clamping-bolts $j$, passing through the bolt-holes $k$ in the rim, the bolt-receiving slots in the annular sections, and corresponding bolt-holes $l$ in the locking-plate $f$, securely fasten the locking-plate to the rim and cause it to clamp the annular sections and tire in position. It is obvious that the displacement of the annular sections having the section-spacing protuberances and the locking-plate having apertures therefor clamped at several places to the rim under ordinary conditions would not be possible and also that the clamping pressure of the locking-plate and the annular sections on the margins of the tubular covering would prevent its displacement from the tire.

For tires subject to heavy loads I make the annular sections of a series of separate concentric bands reinforcing each other during the flections of the tire, each band being formed as above described, but slightly less in diameter than the next outer one, each band or leaf contracting or expanding in unison with the others of the same section. A tire constructed on this principle is particularly adapted for bicycles, automobiles, and transportation-vehicles of all descriptions, wherein it is necessary or advisable to compensate for the unevenness of the road-bed by cushioning the impact of the wheels against the irregularities thereof.

Having thus fully described my invention, what I claim as new, and desire to secure by Letters Patent, is—

1. In a metallic tire the combination of the rim and a series of annular sections secured thereto having their meeting edges overlapping to form the tread of the tire and movably embrace the sides of the body portions and provided with a series of internal section-spacing protuberances, substantially as specified.

2. In a metallic tire the combination of the rim, a series of annular sections having their meeting edges overlapping to form the tread of the tire and movably embrace the sides of the body portions and having internal projecting protuberances and a locking-plate to surround the protuberances and to secure the sections to the rim, substantially as specified.

3. In a metallic tire the combination of the rim, a series of annular sections having their meeting edges overlapping to form the tread of the tire and movably embrace the sides of the body portions, internal section-spacing protuberances for the annular sections and an apertured locking-plate to receive the section-spacing protuberances and clamp the sections to the rim, substantially as specified.

4. In a metallic tire the combination of the rim, a series of annular sections secured thereto having their meeting edges overlapping to form the tread of the tire and movably embrace the sides of the body portions and provided with internal spacing-protuberances, and an apertured locking-plate to receive the protuberances and clamp the sections to the rim, and a tubular covering clamped to the rim by the annular sections, substantially as specified.

5. In a metallic tire the combination of the rim, a series of annular sections having their meeting edges overlapping to form the tread of the tire and movably embrace the sides of the body portions, internal section-spacing protuberances for the annular sections, an apertured locking-plate to receive the section-spacing protuberances and clamp the sections to the rim, and a tubular covering clamped thereto by the annular sections, substantially as specified.

6. In a metallic tire the combination of the rim, a series of annular sections secured thereto having their meeting edges overlapping to form the tread of the tire and movably embrace the sides of the body portions and provided with internal protuberances, an apertured locking-plate to receive the protuberances and secure the tire to the rim, circumferential grooves in the outer face of the rim and a tubular covering having annular flanges to enter the grooves clamped therein by the annular sections, substantially as specified.

7. In a metallic tire the combination of the rim, a series of annular sections having their meeting edges overlapping to form the tread of the tire and movably embrace the sides of the body portions, internal section-spacing protuberances for the annular sections, an apertured locking-plate to receive the section-spacing protuberances and clamp the sections to the rim, circumferential grooves in the outer face of the rim and a tubular covering having annular flanges to enter the grooves, substantially as specified.

Toronto, May 23, 1902.

W. THOMPSON.

In presence of—
  C. H. RICHES,
  F. B. JARMAN.